June 18, 1963 G. A. LYON Re. 25,397

WHEEL COVER

Original Filed Sept. 30, 1957

Inventor
GEORGE ALBERT LYON by Lick, Sherman, Merriam, Cross & Simpson Attys.

United States Patent Office

Re. 25,397
Reissued June 18, 1963

25,397
WHEEL COVER

George Albert Lyon, Detroit, Mich., assignor to Lyon Incorporated, Detroit, Mich., a corporation of Delaware Original No. 2,970,009, dated Jan. 31, 1961, Ser. No. 686,991, Sept. 30, 1957. Application for reissue Oct. 30, 1961, Ser. No. 149,157.
17 Claims. (Cl. 301—37)

Matter enclosed in heavy brackets [ ] appears in the original patent but forms no part of this reissue specification; matter printed in italics indicates the additions made by reissue.

The present invention relates to improvements in wheel structures and more particularly concerns the ornamental and protective covering of the outer sides of vehicle wheels with the provision of novel means for providing a wheel with a simulated white or other colored sidewall for a tire on the wheel.

For ornamental purposes, automobile tires are commonly provided with white sidewalls, the remainder of the tire being of a more or less black appearance. The white rubber used for the white sidewall is applied as a veneer and is of a different composition from the remainder or body of the tire and actually requires a different vulcanizing treatment, to the extent that the temperature and time of cure are somewhat different from the black rubber of the tire body. This has created some necessity for compromise in the vulcanization of tires with white sidewalls, generally resulting in some sacrifice of quality.

To overcome the disadvantages of cure compromise, it has been proposed to secure the white sidewall portion or veneer to the sidewall of the tire after the tire has been vulcanized. Such after-attached sidewall members are inherently liable to such disadvantages as peeling, and the like and of course require a separate attaching or vulcanizing operation and equipment that raises costs.

It has also been heretofore proposed to provide separate simulated white sidewall ring members that are secured between the terminal flange of the tire rim and the bead portion of the tire and separably hug the sidewall of the tire. Such simulated or mock tire white sidewall rings require, of course, that the tire be deflated in order to install the ring members. Should such simulated sidewall rings become damaged, it is necessary to deflate the tire not only to remove the damaged ring but also to replace the ring. Furthermore, a disadvantage of such simulated white sidewall rings is that, especially with tubeless tires there is apt to be interference with proper sealing, gripping engagement of the tire bead portion with the opposing surfaces of the tire rim and more particularly the terminal flange between which and the tire bead the simulated white sidewall ring is clampingly interposed.

It is accordingly an important object of the present invention to overcome the foregoing and other difficulties and disadvantages of the prior expedients and to provide a simulated tire sidewall of improved appearance and which can be applied or removed, or replaced without disturbing the tire.

Another object of the invention is to provide an improved tire sidewall simulating member which serves also as means for covering the tire rim terminal flange as well as wheel balancing weights that may be carried by such flange.

A further object of the invention is to provide a novel tire sidewall simulating ring member which is adapted for optional assembly with a wheel cover for disposition over the outer side of the wheel.

Yet another object of the invention is to provide a tire sidewall simulating flexible ring device which is adapted to be carried in seating engagement with the outer side of a tire rim.

It is a further object of the invention to provide a novel tire sidewall simulating extension ring structure which is adapted to be carried by a wheel cover and in assembly with the wheel serves as cushioning and turn preventing means for the wheel cover.

Other objects, features and advantages of the present invention will be readily apparent from the following detailed description of a preferred embodiment thereof taken in conjunction with the accompanying drawing, in which.

Figure 2:
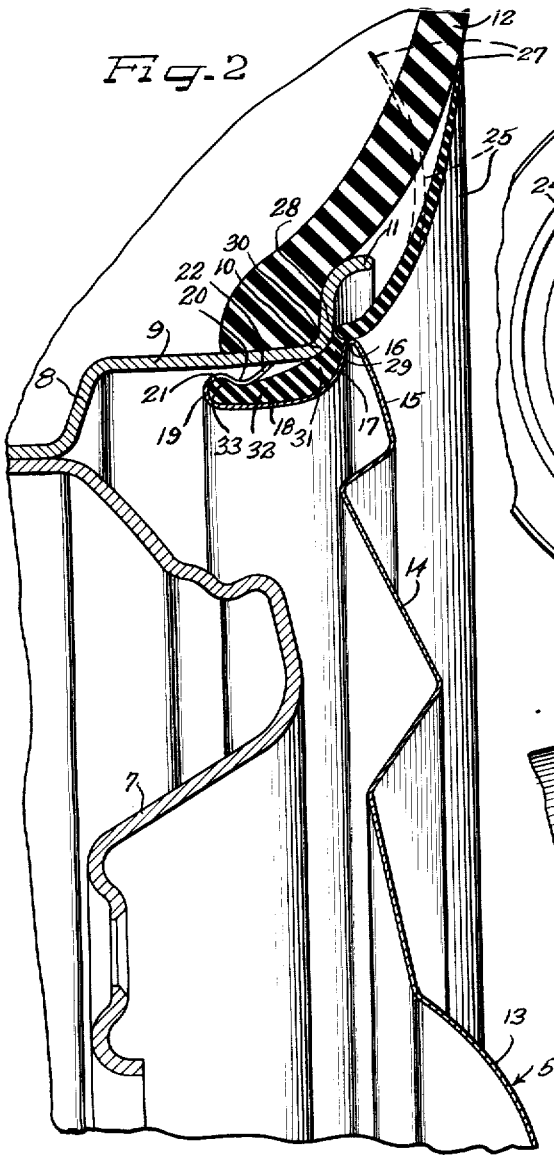
FIGURE 2 is an enlarged fragmentary radial sectional detail view taken substantially on the line II—II of FIGURE 1.
Figure 1:
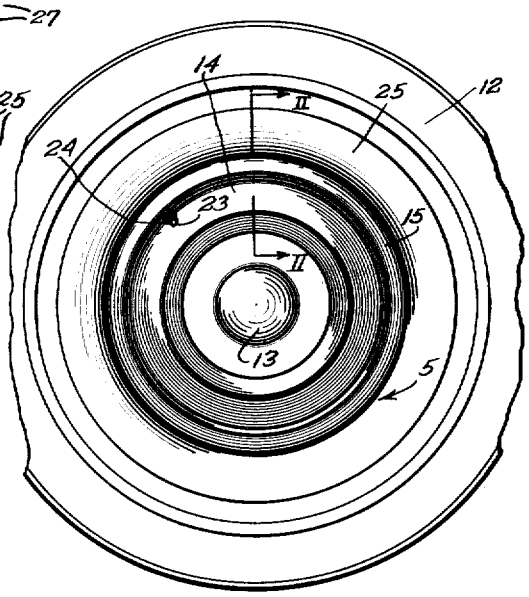
FIGURE 1 is an outer side elevational view of a vehicle wheel embodying features of the invention.
Figure 3:
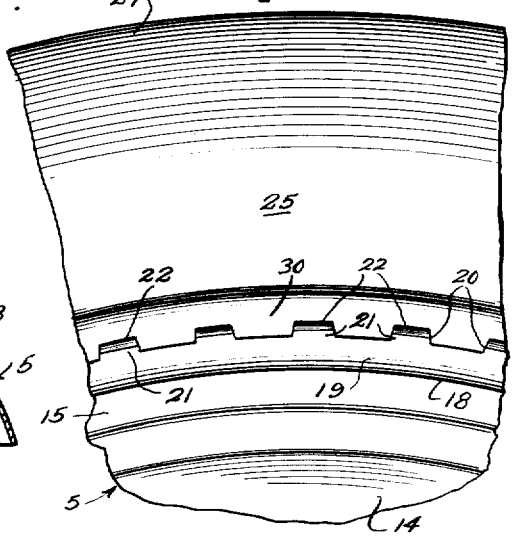
FIGURE 3 is a fragmentary rear elevational view of the cover and sidewall ring member of FIGURE 2.

A wheel cover 5 is constructed and arranged to be applied over the outer side of a wheel such as an automobile wheel comprising a disk spider wheel body 7 supporting in the usual way a tire rim of the drop center multi-flange type having an outer side flange 8 from which extends generally axially outwardly an intermediate flange 9 joining on a generally radially inwardly and axially outwardly facing annular rounded shoulder 10 a terminal flange 11. A pneumatic tire 12 which may be of the tubeless type is adapted to be supported by the tire rim.

The cover 5 is adapted to be made as a drawn stamping from suitable sheet or strip stock such as stainless steel, brass or the like and includes a central crown portion 13 about which is an intermediate contoured portion 14 leading to a marginal rib-like portion 15 extending to a diameter for overlying the rim shoulder 10. An underturned reinforcing flange 17 provides a finished reinforced rib-like edge extremity 16 for the cover and merges into a continuous axial flange 18 of a diameter to telescope into concentric spaced relation within the intermediate flange 9. On its axially inner extremity, the flange 18 is provided with a generally radially outwardly turned reinforcing terminal flange portion 19 which is provided with an annular series of spaced cover retaining fingers 20. Each of the fingers 20 comprises a generally axially outwardly extending extension from the edge of the turned terminal flange 19 accommodated in the space between the cover flange 18 and the tire rim intermediate flange 9.

At juncture with the turned terminal flange 19, the retaining fingers 20 [are of] *have turned portions 21 providing with the terminal flange portion 19 and the adjoining portion of the flange 18;* generally hook or loop structure [21] with the [loop] *portions 21* being turned toward the flange 18 and merging on a generally ogee curvature with the body portion of the finger leg which has the axially outer extremity thereof turned generally radially and axially outwardly obliquely to provide a retaining terminal flange 22 which is of substantial stiffness and normally projects radially outwardly to a larger diameter than the diameter of the axially outer portion of the intermediate flange 9. Through this arrangement, the cover is adapted to be applied to the outer side of the wheel by registering a valve stem 23 carried by the side flange 8 through a valve stem aperture 24 in the intermediate portion 14 of the cover, and then pressing the cover axially inwardly to effect retaining gripping engagement of the several finger terminals 22 with the intermediate flange 9 and during which the fingers 20 are resiliently flexibly deflected radially inwardly and placed under tension reacting to drive the tips of the terminals 22 retainingly against the intermediate flange.

In order to afford for the outer side of the wheel the appearance of the tire 12 and more particularly the outer sidewall thereof, merging with the edge of the cover 5 at the turned extremity 16, a tire sidewall simulating non-metallic ring member 25 is provided. While such ring member 25 may be white in order to provide a white sidewall appearance for the tire, it may also be provided in various other color effects for ornamental, car model identification, design effects. By preference, the ring member 25 is made from a rubber or rubber-like material such as one of the suitable plastic, synthetic rubbers of which butyl is a prime example. This material is characterized by excellent durometer control, high quality pigmentation capability, desirable resiliency and elasticity with nevertheless high flexibility, and withal durability as well as ease of moldability and vulcanization for mass production purposes.

In a preferred construction, the non-metallic sidewall simulating ring member 25 is formed in concave convex cross-section generally similar to the incurve of the tire sidewall when assembled with the tire. However, to enable self-positioning, continuous hugging engagement and following or adjustment with respect to the tire sidewall in any condition of inflation or deflation of the tire in any circumferential portion thereof, including "live" movements in the running of the tire with the wheel, the ring member 25 is constructed in the tire sidewall overlapping portion thereof normally to assume a smaller radius cross-sectional shape substantially as shown in dash outline in FIGURE 2, wherein at least the radially outer portion of the ring member including a feather edge 27 at its radially outer extremity, is disposed more axially inwardly than in an axially outwardly flexed, resiliently tensioned tire sidewall engaging condition or position as shown in full outline in FIGURE 2. This relationship assures the firm face-to-face hugging self-adjustable relation of the edge 27 against the tire sidewall under resilient tension.

Resilient tensioning under the flexed mounted condition of the ring member 25 is enhanced by the structure thereof whereby it is of increased thickness radially inwardly from the tire sidewall engaging tip or edge extremity terminus 27 thereof, with the tapering thickness greatest toward the radially inner portion of the ring member and especially in the area thereof where it is engaged by the margin of the cover 5 and the tire rim. As shown, the curvature or transversely or cross-sectionally arched form of the ring member 25 is such that it provides in the mounted relation to the wheel a substantial chamber therebehind over the tire rim terminal flange 11 especially adapted for accommodating wheel balancing weights that may be attached to the terminal flange. To this end, the inner marginal portion of the ring member 25 extends generally radially and axially inwardly and provides a generally axially outwardly opening groove 28 nestingly receptive of the cover edge formation 16. Extending angularly, radially inwardly from the groove 28 and joined at such groove with the main body portion of the ring 25 is an annular seating flange 29 which at its axially outer side internestingly engages with the underturned cover marginal flange 17, and at its axially inner side provides a generally axially inwardly and radially outwardly facing annular groove 30 receptive of and bottomed or seated on the tire rim shoulder 10 in the mounted condition of the assembly. Through this arrangement, the edge structure of the cover 5 including the underturned flange 17 and the turned rib edge 16 coact with the inner marginal structure of the ring member 25 to maintain the ring member in concentric assembly and to clamp the ring member flange 30 against the tire rim. Furthermore, the turned cover edge 16 provides a fulcrum about which the ring member 25 is adapted to be swung axially outwardly into an open relation selectively for such purposes as gaining access to the chamber behind the ring member to apply wheel balancing weights to the tire rim terminal flange 11, or the like.

In order to thoroughly retain the inner marginal structure of the ring member 25 against withdrawal from the clamped engagement between the cover margin and the tire rim, an interlocked relationship of the ring marginal structure with the cover and with the tire rim is provided. For this purpose, the axially inwardly extending marginal flange portion 29 of the ring member extends generally radially and axially inwardly into a substantially thickened rib portion 31 of substantially greater thickness than the relatively thinner connecting or juncture neck portion of the ring member at the groove 29 thereof where the principal clamping coaction with the ring member margin is effected by the cover margin in association with the shoulder 10 of the tire rim. This construction in and of itself affords substantial resistance to pull-out.

Additional assurance against pull-out, as well as retaining engagement to enable unitary handling of the cover 5 and the ring member 25 is afforded by providing the ring member 25 with an inner marginal generally axially inwardly extending flange extension 32 from the rib portion 31 constructed for generally conformed engagement with the radially outer side of the cover marginal flange 18 and of a smaller outside diameter than the intermediate flange 9 of the tire rim so as to be engageable between the cover flange 18 and the retaining fingers 20 serving as retaining tabs in engagement with the flange extension 32. A terminal annular bead 33 on the axially inner end of the flange 32 is generally interlockingly engageable within the turned terminal flange 19 and the juncture hook or loop portions 21 of the retaining fingers of the cover. The construction and relationship is such that the axially opposed spaced shoulders provided by the underturned cover marginal flange 17 and the turned terminal flange 19 in engagement with the ring marginal structure substantially retain the ring against axial displacement relative to the cover. By preference, the ring marginal flange 32 is provided of a slightly smaller inside diameter than the outside diameter of the cover flange 18 so that in assembling the flange 32 about the flange 18, there is a slight elastic stretching of the flange 32 so that it grips the flange 18 under resilient tension.

In addition, by *having the retaining fingers interlockingly related to the respective associated terminal edge portions of the ring flange 32 and projecting into a recessed area in the ring flange axially outwardly adjacent to the associated edge portions, as shown in FIG. 2, and resulting in* the overlying interlockingly shouldering relation of the intermediate body portions of the retaining fingers 20 with respect to the *axially outer side of the* inner terminal rib or bead 33 of the ring member, substantial resistance is normally afforded against pull-out of the bead 33 for thus additionally retaining the ring member in assembly with the cover. In the mounted relationship of the cover upon the outside of the wheel, the radially inward flexing of the retaining fingers 20 toward and against the flange 32 of the ring member effects a further interlock grip of the bead 33 and thus even more securely retains the ring against pull-out. Further, the resilient backup afforded by the material of the ring flange 32 between the retaining fingers 20 and the cover flange 18 increases the resilient tensioning of the retaining fingers and thus the gripping engagement of the retaining terminals 22 with the intermediate flange of the tire rim.

In applying the cover 5 with the ring member 25 carried in unitary assembly therewith to the outer side of the wheel, the tire sidewall engaging tip 27 is carried into engagement with the tire sidewall and as the cover is pushed home onto the wheel, the ring member 25 is placed under resilient tensioned engagement with the tire sidewall by the flexing of the outer portion of the ring member from the dash line position shown in FIGURE 2 to the full outline position. In the fully assembled or mounted, marginally bottomed relationship of the wheel cover and ring member with respect to the tire rim, the marginal portion of the ring member not only affords a cushion for the overlying cover portions, but also serves as a vibration damping, sound deadening structure. Not only does the inner marginal structure of the ring member 25 afford cushioning with respect to axially inwardly imposed forces on the cover margin but also provides cushioning against road shocks or other forces in a radial or diametrical direction. Also, since the material from which the ring member 25 is made has a high coefficient of friction and a substantial area of the inner marginal flange 29 and more especially within the groove 30 thereof engages the tire rim, while an even larger area of the ring margin engages the margin of the cover, substantial resistance to turning of the cover on the wheel is afforded in association with the retaining finger terminals 22 which also afford substantial resistance to turning of the cover as well as against axial displacement of the cover from the wheel.

In removing the cover from the wheel, the ring member 25 is flexed locally axially outwardly and a pry-off tool such as a screwdriver may then be inserted behind the cover marginal flange 17 by introduction of the tip of the pry-off tool behind the ring marginal flange 29 and application of axially outward pry-off force for sliding the tips of the retaining finger terminals 22 axially outwardly from their engagement with the intermediate flange 9 of the tire rim. During this the resilient ring flange 29 affords protection against pry-off tool damage or denting of the cover margin shoulder structure.

It should be noted that although the cover 5 has been shown as a full disk cover, of a diameter to extend over the wheel body 7 and the tire rim, it may be constructed as a ring to be entirely over the tire rim or over the tire rim and the adjacent portion of the wheel body, as preferred.

It will be understood that modifications and variations may be effected without departing from the scope of the novel concepts of the present invention.

I claim as my invention:

1. In a wheel structure including a wheel body supporting a multi-flange tire rim for carrying a pneumatic tire, the rim having a radially inwardly facing and axially extending flange with a generally axially outwardly facing shoulder at the axially outer end of said flange, a cover assembly for disposition over the outer side of the wheel including a circular cover member having a marginal portion for overlying the shoulder of the tire rim and provided therebehind with cover retaining terminal structure engageable in press-on, pry-off relation with said flange of the tire rim, and a tire sidewall simulating extension ring having a radially outer portion for overlying the tire sidewall and an inner marginal portion for underlying the margin of the cover and arranged to be clamped against the tire rim shoulder by said cover marginal portion, said inner marginal portion of the ring having *a generally axially inwardly projecting* inner terminal structure interlockingly gripped by said retaining terminal structure of the cover, *said inner terminal structure of the ring having edge portions and a recessed area axially outwardly adjacent thereto and said retaining terminal structure projecting into said recessed area.*

2. In a wheel structure including a wheel body supporting a multi-flange tire rim for carrying a pneumatic tire, the rim having a radially inwardly facing and axially extending flange with a generally axially outwardly facing shoulder at the axially outer end of said flange, a cover assembly for disposition over the outer side of the wheel including a circular cover member having a marginal portion for overlying the shoulder of the tire rim and provided therebehind with cover retaining terminal structure engageable in press-on, pry-off relation with said flange of the tire rim, and a tire sidewall simulating extension ring having a radially outer portion for overlying the tire sidewall and an inner marginal portion for underlying the margin of the cover and arranged to be clamped against the tire rim shoulder by said cover marginal portion, said inner marginal portion of the ring having *a generally axially inwardly projecting* inner [terminal structure] *marginal portion with an axially inner extremity* interlockingly gripped by said retaining terminal structure of the cover, said retaining terminal structure of the cover comprising a series of circumferentially spaced retaining fingers having axially inner loop portions within which the inner extremity of the inner marginal portion of the ring is interlockingly engaged, *said inner marginal portion having axially outwardly adjacent to said extremity a recessed area and said retaining fingers having portions thereof projecting interlockingly into said recessed area.*

3. In a wheel structure including a wheel body and a multi-flange tire rim for supporting a pneumatic tire, the rim including an intermediate flange and a terminal flange with a shoulder at juncture of said flanges, a trim assembly for disposition at the outer side of the wheel including a metallic circular wheel overlying member having a marginal portion provided with an underturned flange for opposing disposition relative to said rim shoulder and having extending from said underturned flange a generally axially inwardly extending flange for telescoping spaced disposition relative to the intermediate flange and provided at its axially inner edge with a series of generally axially outwardly extending retaining fingers engageable in press-on, pry-off relation with the intermediate flange, a tire sidewall simulating ring member of non-metallic material comprising a resiliently flexible annular tire sidewall overlapping portion joined at its radially inner side to an angular *inner* marginal flange interengageable with said underturned cover marginal flange and arranged to be clamped against said rim shoulder by said underturned flange, the inner extremity portion of said ring inner marginal flange *projecting generally axially inwardly and* being interlockingly engaged between said retaining fingers and said axially extending cover flange and coacting with said clamped portion to restrain the ring against pull-out, *said inner marginal flange having a recessed area axially outwardly adjacent to said extremity into which portions of the retaining fingers project.*

4. In a wheel structure including a wheel body and a multi-flange tire rim for supporting a pneumatic tire, the rim including an intermediate flange and a terminal flange with a shoulder at juncture of said flanges, a trim assembly for disposition at the outer side of the wheel including a metallic circular wheel overlying member having a marginal portion provided with an underturned flange for opposing disposition relative to said rim shoulder and having extending from said underturned flange a generally axially inwardly extending flange for telescoping spaced disposition relative to the intermediate flange and provided at its axially inner edge with a series of generally axially outwardly extending retaining fingers engageable in press-on, pry-off relation with the intermediate flange, a tire sidewall simulating ring member of non-metallic material comprising a resiliently flexible annular tire sidewall overlapping portion joined at its radially inner side to an angular *inner* marginal flange interengageable with said underturned cover marginal flange and arranged to be clamped against said rim shoulder by said underturned flange, the inner extremity portion of said ring inner marginal flange *projecting generally axially inwardly and* being interlockingly engaged between said retaining fingers and said axially extending cover flange and coacting with said clamped portion to restrain the ring against pull-out, *said inner marginal flange having a recessed area axially outwardly adjacent to said extremity into which portions of the retaining fingers project,* said inner marginal ring flange being elastically tensioned about said cover flange and serving as a cushion between the cover flange and the tire rim.

5. In a trim assembly for disposition at the outer side of a vehicle wheel, a circular metallic member having a generally axially extending flange with terminal retaining fingers providing *with contiguous* juncture *portions of the flange respective* loops and *having* retaining tips, a non-metallic resiliently flexible ring member projecting radially beyond the edge of the circular member and having an inner marginal flange structure by which it is carried by the circular member, said flange structure including a beaded edge portion interlockingly gripped within [the] *said* loops *by portions of the fingers being in overlying interlocking relation to the axially outer side of the beaded edge portion* [of said fingers].

6. In a trim assembly for disposition at the outer side of a vehicle wheel, a circular metallic member having a generally axially extending flange with terminal retaining fingers providing *with contiguous* juncture *portions of the flange respective* loops and *having* retaining tips, a non-metallic resiliently flexible ring member projecting radially beyond the edge of the circular member and having an inner marginal flange structure by which it is carried by the circular member, said flange structure including a beaded edge portion interlockingly gripped within said [the] loops *by portions of the fingers being in overlying interlocking relation to the axially outer side of the beaded edge portion* [of said fingers], said ring flange structure being elastically tensionably engaged about said circular member flange.

7. In a cover assembly for disposition at the outer side of a vehicle wheel, a circular cover member having an underturned outer flange provided with a generally radially inwardly and then axially inwardly extending flange formation having at the axially inner terminus thereof a turned annular terminal portion from which extend generally axially outwardly cover retaining fingers provided with radially outwardly turned cover retaining terminals engageable with a rim flange of a wheel, a tire sidewall simulating extension member of non-metallic resiliently flexible rubber-like material having a generally radially and axially outwardly extending body portion and an inner marginal portion engaged about said cover [flanges] *flange formation* and having an inner edge portion engaged with said turned annular terminal portion and interlocked within said retaining fingers.

8. In a cover assembly for disposition at the outer side of a vehicle wheel, a circular cover member having an underturned outer flange provided with a generally radially inwardly and then axially inwardly extending flange formation having at the axially inner terminus thereof a turned annular terminal portion from which extend generally axially outwardly cover retaining fingers provided with radially outwardly turned cover retaining terminals engageable with a rim flange of a wheel, a tire sidewall simulating extension member of non-metallic resiliently flexible rubber-like material having a generally radially and axially outwardly extending body portion and an inner marginal portion engaged about said cover *flange formation* [flanges] and having an inner edge portion engaged with said turned terminal portion and interlocked within said retaining fingers, said inner marginal portion of the ring member having a thickened rib portion engageable behind [said] *the* radially extending flange portion of the *flange formation of the* cover and coacting with said edge *portion* in cooperation with the cover [flanges] *flange formation* to retain the ring member in axial assembly with the cover.

9. In a tire side wall extension ring assembly, a side wall ring member adapted to overlap a tire rim terminal flange and the adjacent portion of a tire side wall, and a circular retaining member including a generally axially extending flange with *turned* retaining fingers [of loop form] thereon, said ring member having an inner marginal portion *comprising* [compromising] an annular bead enlargement gripped [in] *by portions of the fingers being in overlying interlocking relation to the axially outer side of the bead enlargement* [finger loops] and with the ring member extending from said bead generally axially outwardly and then radially outwardly.

*10. In a tire sidewall simulating ring assembly, a rubber-like resiliently flexible ring member, and a retaining circular substantially rigid member of sheet metal having retaining fingers thereon providing with the member a structure of generally hook form and with a marginal rib portion of said sidewall simulating ring member interengaged in the hook structure with portions of the fingers overlying the marginal rib portion interlockingly against pull-out from the hook structure whereby to secure the members together to be handled as a unit.*

*11. In a wheel structure including a wheel body supporting a multi-flange tire rim for carrying a pneumatic tire having an outer side wall, the rim having on its axially outer side a generally radially inwardly facing and axially extending annular flange with a generally axially outwardly facing shoulder at the axially outer end of said flange, a trim assembly for disposition at the outer side of the wheel including:*

*(a) a metallic circular wheel overlying member including a generally radially extending flange for opposed disposition to said rim shoulder*

*(b) and having extending from the radially inner side of said radially extending flange a generally axially inwardly extending flange having a radially outer face of smaller diameter than and telescopically disposable with respect to the radially inner face of said rim flange,*

*(c) a ring member of rubber-like material including a generally axially inwardly extending resiliently tensionable annular flange portion in conformed engagement with said radially outer face and with its radially outer face of a diameter smaller than and opposing said radially inner face of the rim flange,*

*(d) and a plurality of retaining fingers comprising functionally integral components of the trim assembly projecting from backed-up relation on said radially outer face of said flange portion radially outwardly and having terminal portions which normally project to a larger diameter than said radially inner face of the rim flange for thrusting into gripping engagement with said radially inner face and being thereby deflected radially inwardly whereby the back-up afforded by said flange portion resiliently tensions the fingers and increases the gripping thrust of said terminal portions.*

*12. In a wheel structure including a wheel body supporting a multi-flange tire rim for carrying a pneumatic tire having an outer side wall, the rim having on its axially outer side a generally radially inwardly facing and axially extending annular flange with a generally axially outwardly facing shoulder at the axially outer end of said flange, a trim assembly for disposition at the outer side of the wheel including:*

*(a) a metallic circular wheel overlying member including a generally radially extending flange for opposed disposition to said rim shoulder*

*(b) and having extending from the radially inner side of said radially extending flange a generally axially inwardly extending flange having a radially outer face of smaller diameter than and telescopically disposable with respect to the radially inner face of said rim flange,*

*(c) a tire sidewall simulating ring member of non-metallic material comprising a generally radially extending tire sidewall overlapping portion having its inner margin in clamped engagement between said radially extending flange and said shoulder,*

*(d) said margin being joined to an angular generally axially inwardly extending resiliently tensionable annular flange extension in conformed engagement with said radially outer face and with its radially outer face of diameter smaller than said radially inner face of the rim flange,*

*(e) and a plurality of retaining fingers comprising functionally integral components of the trim assembly projecting from backed-up relation on said radially outer face of said flange extension radially outwardly*

*and having terminal portions normally projecting to a larger diameter than said radially inner face of the rim flange for thrusting gripping engagement with said radially inner face and being thereby deflected radially inwardly whereby the back-up afforded by said flange extension resiliently tensions the fingers and increases the gripping thrust of said terminal portions.*

*13. In a wheel structure as defined in claim 12, said ring member having in its inner margin*

*(1) a generally axially outwardly opening groove within which a radially outer terminus defining said radially extending flange is seated for clamping said inner margin against said tire rim shoulder, and said radially inner margin of the ring member*

*(2) having radially inwardly from said groove and at juncture with said flange extension a circular rib structure located radially inwardly adjacent to said tire rim shoulder and affording a thickness greater than the thickness of said margin between said groove and said rim shoulder and resisting pull out from between said radial flange terminus and said shoulder.*

*14. In a wheel structure including a tire rim having an outer side axially extending and radially inwardly facing intermediate flange joining a terminal flange and supportive of a pneumatic tire having an outer sidewall, a trim assembly for disposition at the outer side of the wheel, including:*

*(a) a tire sidewall simulating ring member of non-metallic material having a generally radially extending annular tire sidewall simulating portion of a width to overlie said terminal flange and the tire sidewall,*

*(b) said ring member having an inner marginal generally axially inwardly extending annular elastic resiliently tensionable flange extension of substantial width and having a radially outer face of a diameter slightly less than the radially inner face of the intermediate flange for spaced telescopic disposition within said intermediate flange;*

*(c) and means for retaining said ring member on the wheel including:*

*(d) a generally radially extending annular reinforcing flange for thrusting axially inwardly against the radially inner margin of said tire sidewall simulating portion, said reinforcing flange being joined at its radially inner side to*

*(e) a generally axially inwardly extending annular flange snugly telescopically engaged in said flange extension,*

*(f) and retaining fingers comprising unitary parts of the trim assembly and being in backed up relation on the radially outer face of said flange extension and having retaining terminals projecting generally radially outwardly substantially beyond said radially outer face for retaining gripping engagement with said intermediate flange inner face,*

*(g) said retaining terminals normally projecting to a larger diameter than said intermediate flange inner face and being thereby deflected radially inwardly whereby the resilient back-up and tensioning of said fingers afforded by said flange extension increases the gripping engagement of the retaining terminals with said intermediate flange inner face.*

*15. In a wheel structure as defined in claim 14, said axially extending annular flange having a turned annular reinforcement thereon spaced from and coacting with the radially extending reinforcing flange to maintain the ring flange extension and the axially extending flange against axial separation.*

*16. In a wheel structure as defined in claim 14, said ring flange extension being elastically tensioned about said axially extending annular flange.*

*17. In a tire side wall extension ring assembly,*

*(a) a sidewall ring member adapted to overlap a tire rim terminal flange and the adjacent portion of a tire sidewall,*

*(b) said ring member having an inner marginal resiliently tensionable rubber-like generally axially extending annular flange portion having a radially outer face of a smaller outside diameter than an inner face of a tire rim intermediate flange within which it is adapted to telescope,*

*(c) and means for retaining said ring member on a tire rim including*

*(d) a generally radially extending annular flange engaging against the radially inner margin of said ring member adjacent juncture thereof with said axially extending flange portion and joined at its radially inner side to*

*(e) a generally axially inwardly extending annular flange substantially coextensive with and snugly telescopically engaged in said ring member flange portion,*

*(f) and retaining fingers comprising integral parts of the assembly projecting from backed up relation on said radially outer face of said ring member flange and having radially outwardly projecting terminals for retaining gripping engagement with an opposing tire rim intermediate flange inner face,*

*(g) said retaining terminals normally projecting to a larger diameter than said inner face and being thereby deflected, in the assembled relation of the ring assembly with the tire rim, radially inwardly toward said ring member flange and tensioned by the resilient back-up afforded by said ring member flange.*

References Cited in the file of this patent or the original patent

UNITED STATES PATENTS

| | | |
|---|---|---|
| 2,618,513 | Horn | Nov. 18, 1952 |
| 2,624,634 | Lyon | Jan. 6, 1953 |
| 2,690,358 | Lyon | Sept. 28, 1954 |
| 2,757,972 | Lyon | Aug. 7, 1956 |
| 2,757,985 | Lyon | Aug. 7, 1956 |
| 2,970,010 | Lyon | Jan. 31, 1961 |
| 3,050,338 | Lyon | Aug. 21, 1962 |

FOREIGN PATENTS

| | | |
|---|---|---|
| 1,061,278 | France | Nov. 25, 1953 |
| 61,528 | France (1st addition to 1,015,295) | Nov. 24, 1954 |